Aug. 26, 1969          C. F. EISEN          3,463,296

DEVICE FOR FEEDING PLASTIC CONTAINERS IN PAIRS

Filed Sept. 15, 1967          2 Sheets-Sheet 1

INVENTOR:
CARL F. EISEN
BY Peter L. Tailer
ATTORNEY

Aug. 26, 1969       C. F. EISEN       3,463,296
DEVICE FOR FEEDING PLASTIC CONTAINERS IN PAIRS
Filed Sept. 15, 1967       2 Sheets-Sheet 2
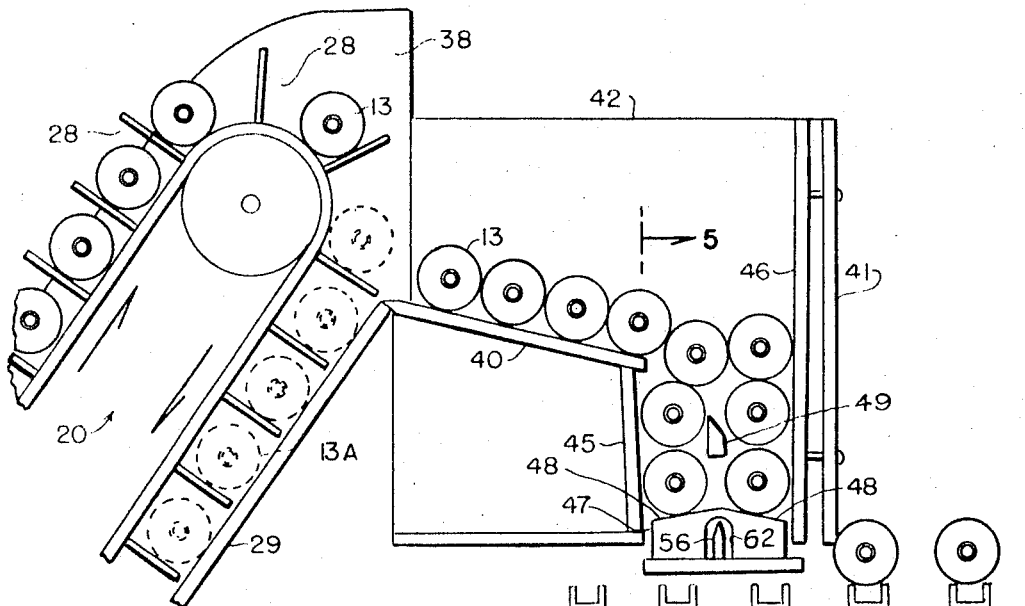
FIG. 4
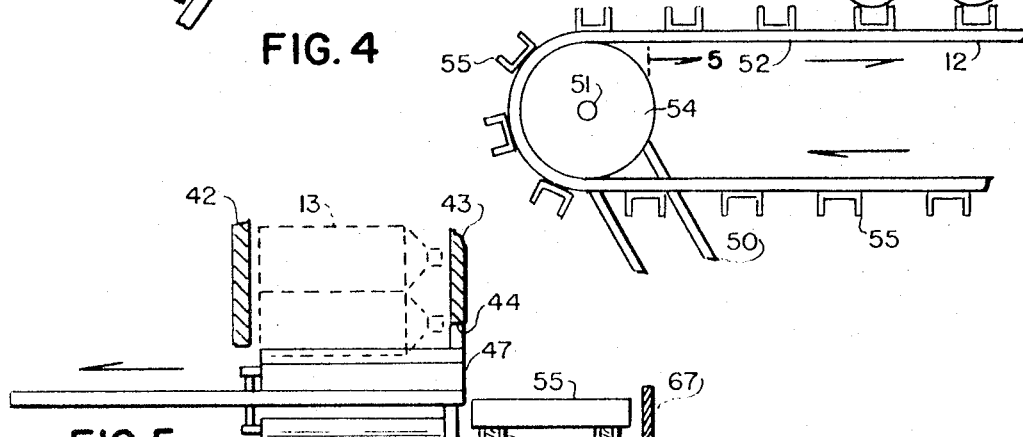
FIG. 5
FIG. 6
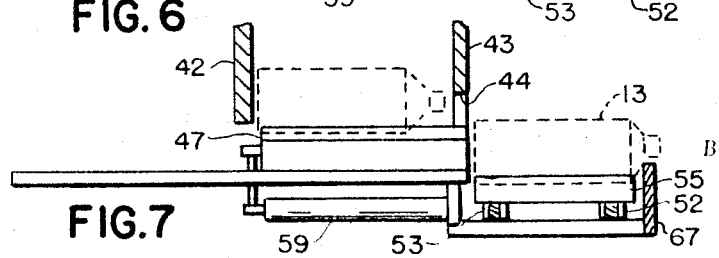
FIG. 7
INVENTOR:
CARL F. EISEN
BY Peter L. Tailer
ATTORNEY

United States Patent Office 3,463,296
Patented Aug. 26, 1969

3,463,296
DEVICE FOR FEEDING PLASTIC CONTAINERS IN PAIRS
Carl F. Eisen, 35 W. 9th St., New York, N.Y. 10011
Filed Sept. 15, 1967, Ser. No. 668,127
Int. Cl. B65g 47/00
U.S. Cl. 198—43                                4 Claims

ABSTRACT OF THE DISCLOSURE

Plastic bottles are conveyed to a sloping ramp from which they roll to form two vertical column on a longitudinally movable reciprocating bottle delivery shuttle which withdraws to drop the two lowermost bottles in front of it and advances to push these two lowermost bottles onto a conveyor.

BACKGROUND OF THE INVENTION

Machines to screen and print plastic bottles or other containers are substantially automatic and relatively fast. It is very desirable to automatically load the conveyor of such a bottle screening machine to relieve the operator for other tasks. Since bottle screening machines may screen two bottles simultaneously for higher production, their conveyors intermittently advance two bottles at a time. Thus there is a need for a device to simultaneously feed pairs of bottles to the machine conveyor while it is at rest.

SUMMARY OF THE INVENTION

Plastic bottles or the like are carried out of a bin or a bin conveyor having compartments each accommodating a single bottle therein. The bottles are delivered to a downward sloping ramp. If bottles are not rolling from the ramp, they block the exit of compartments so that the conveyor returns bottles to the bin. A guide wall extends downward below the lower end of said ramp and an end wall is spaced more than two bottles widths from said guide wall. A longitudinally movable bottle ejecting shuttle is disposed at the lower ends of said guide wall and said end walls so that bottles roll off said ramp to form two vertical columns resting on said shuttle, the upper bottles of said two columns preventing bottles on said ramp from rolling thereoff. Longitudinal reciprocation of said shuttle allows the lower two bottles of said columns to drop in front of said shuttle to be ejected by it onto a machine conveyor for screening.

The device of this invention provides a superior feeding device for cylindrical containers which is completely foolproof, positive, and fast in its action. Further, the device of this invention does not damage the plastic bottles.

BRIEF DESCRIPTION OF THE DRAWING

FIGURE 4 is a side view of a fragment of the upper part of the bin conveyor, a hopper, and one end of a screening machine conveyor, all elements having front cover plates and supports removed; and FIGURES 5, 6, and 7 are sections taken on lines 5—5 of FIGURE 4 showing the bottle ejecting shuttle ejecting a pair of bottles onto the screening machine conveyor, the bottles being shown in dotted lines.

DESCRIPTION OF THE PREFERRED EMBODIMENT

Figure 1:
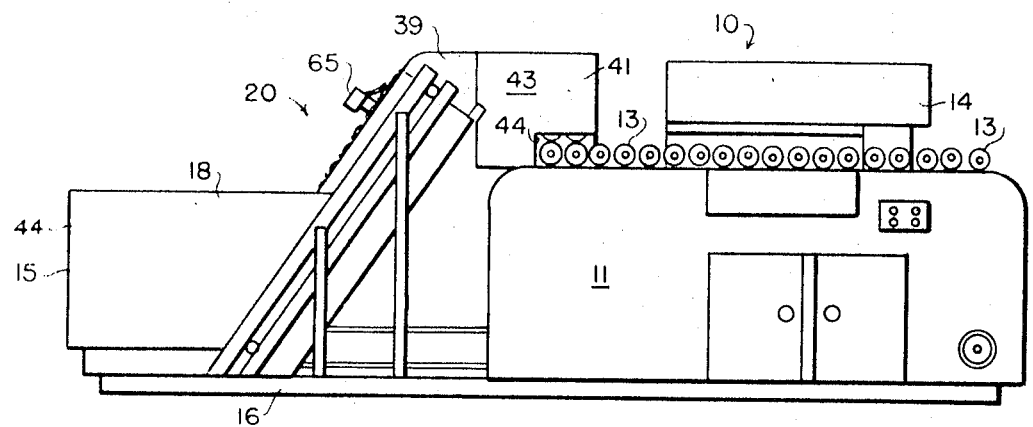
FIGURE 1 is a front view of a screening machine for plastic bottles with the feed device of this invention attached thereto.

As shown in FIGURE 1, a bottle screening machine is generally designated by the reference numeral 10. The bottle screening machine 10 has a cabinet 11 above which a conveyor 12 (shown in FIGURE 4) intermittently advances plastic bottles 13 to have printed matter, labels, or the like screened thereon by screening apparatus 14 which may be conventional. For high speed production, the bottles 13 are screened in pairs by the apparatus 14. The device of this invention feeds bottles 13 onto conveyor 12 in pairs.

Figure 3:
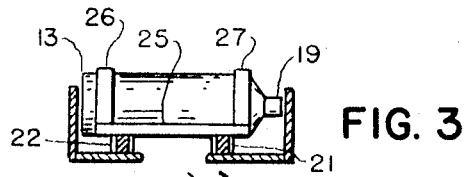
FIGURE 3 is a section taken through the bin conveyor on line 3—3 of FIGURE 2.
Figure 2:
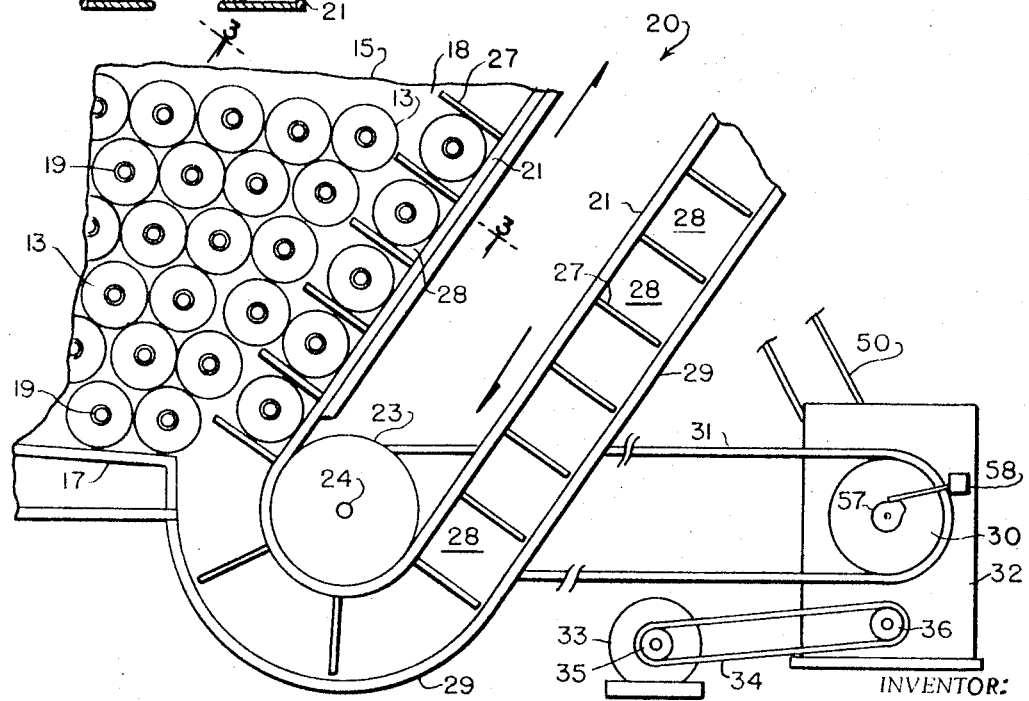
FIGURE 2 is a side view of a fragment of a bin and the lower end of a bin conveyor extending therein with the bin and the bin conveyor front plates and supports removed and with drive elements shown associated with the bin conveyor.

Referring now to FIGURES 1, 2, and 3, a bin 15 is fixed to one end of machine 10 by a base 16. Bottles 13 are loaded in bin 15 with their necks 19 extending forward. Bin 15 has a floor 17 which slopes towards machine 10 and it has side walls 18 which extend with slight clearance beyond the ends of the bottles 13. A bin conveyor, generally designated by the reference numeral 20, has a pair of chains 21 and 22, or other like positively driven elements, which extend about suitable sprockets or the like 23 mounted on axle 24.

The chains 21 and 22 have sets of cross members 25 fixed thereto with uprights 26 and 27 mounted thereon to form a bottle conveyor with bottle containing compartments 28. Axle 24 is disposed below and beyond the lower end of floor 17 so bottles 13 will enter the upwardly moving compartments 28. Each compartment 28 is sized to contain only a single bottle 13. A lower bottle guide 29 extends about the lower portion of conveyor 20 so that, if bottles 13 do not roll free from the upper portion of conveyors 20 as will hereinafter be explained, they will remain in the compartments 28 and circulate through the bin 15.

Conveyor 20 may be driven by sprocket 30 and chain 31 if desired. Sprocket 30 is mounted on a transmission 32 of the bottle screening machine 10 which is driven by motor 33, chain 34, and the sprockets 35 and 36. Thus transmission 32 drives the bottle screening machine and may also drive conveyor 20.

Referring now to FIGURES 4–7, the upper portion of conveyor 20 extends between a rear cover plate 38 and a front cover plate 39 (shown in FIGURE 1). Bottles 13 roll from the compartments 28 down a sloping ramp 40 which is within hopper 41. Hopper 41 has a rear wall 42 and a front wall 43 containing an exit opening 44 (shown in FIGURE 1). A guide wall 45 extends downward in hopper 41 below the lower end of ramp 40. An end wall 46 is disposed at least two widths of the bottles 13 from the end of ramp 40 and guide wall 45. Disposed below and between the guide wall 45 and the end wall 46 is a bottle ejecting shuttle 47 which is mounted so as to be longitudinally slidable.

Shuttle 47 is so placed that two vertical columns of bottles 13 are formed to rest on it as bottles 13 roll from ramp 40. A divider 49 may be placed in hopper 41 to assist in forming the columns of bottles 13 and spread them a desired distance apart. Shuttle 47 has outward sloping upper surfaces 48 to roll bottles 13 resting thereon outwards.

As shown in FIGURES 2 and 4, transmission 30 intermittently drives chain 50 to drive and intermittently advance the screening machine conveyor 12. Conveyor 12 has a pair of endless chains 52 and 53 disposed about sprockets 54 on shaft 51. Chains 52 and 53 have mounted on them bottle receiving channels 55. Transmission 32 intermittently advances conveyor 51 to pass two channels 51 or bottle receiving stations past any given point.

Referring again to FIGURES 4-7, the lower portions of shuttle 47 contain an inverted longitudinal opening 62 within which there is disposed a fixed divider blade 56. As shown in FIGURE 2, when cam 57 activates microswitch 58 or any other suitable control device, a pneumatic cylinder 59 is activated to move shuttle 47 rearwardly from the position shown in FIGURE 5 to that shown in FIGURE 6. This allows the columns of bottles 13 to drop downward with the lowermost bottles 13 resting on each side of divider blade 56. When cylinder 59 returns to its original position as shown in FIGURE 7, shuttle 47 forces a pair of bottles 13 longitudinally forward through exit opening 44 onto a stationary pair of bottle receiving channels 55. Exit opening 44 is formed so as to only allow bottles 13 which have dropped in front of shuttle 47 to pass therethrough. Transmission 32 then advances conveyor 20 to screen two bottles 13 as two more bottles are ejected. A bottle retaining guide strip, shown in FIGURES 5, 6, and 7, longitudinally positions the ejected bottles 13 on the channels 55.

If bottles are not removed from hopper 41, the uppermost bottle 13 on ramp 40 will prevent additional bottles 13 from leaving their compartments 28 so that they will be recirculated as indicated by the bottles 13A drawn in dotted lines in FIGURE 4. If desired, end wall 46 may be adjustably positioned to compensate for slight bottle diameter differences. As shown in FIGURE 1, a microswitch 65 may be provided to indicate an empty compartment 28 in conveyor 20 to stop the apparatus.

While this invention has been shown and described in the best form known, it will nevertheless be understood that this is purely exemplary and that modifications may be made without departing from the spirit and scope of the invention.

What is claimed is:

1. For use with a screening machine for plastic bottles, said screening machine having an intermittently advanced conveyor; a device for feeding plastic bottles in pairs onto said screening machine conveyor comprising, in combination, a bin, a hopper having front and rear walls, a downward sloping ramp between said front and rear walls, a guide wall between said front and rear walls extending downward below the lower end of said ramp, and an end wall of said hopper disposed at least two bottle widths from said ramp and said guide wall, a longitudinally movable shuttle between the lower ends of said guide wall and said end wall, a bin conveyor depositing bottles from said bin on said ramp of said hopper to roll downward between said guide wall and said end wall forming two columns resting on said shuttle, said shuttle having outwardly sloping upper surfaces so that bottles resting thereon tend to roll outwards, said front wall of said hopper containing an exit opening in front of said shuttle accommodating longitudinal passage of a pair of bottles therethrough, and means reciprocating said shuttle withdrawing said shuttle to a position behind said rear wall of said hopper allowing the lowest pair of bottles of said columns to fall in front of said shuttle and advancing said shuttle ejecting the pair of bottles in front of said shuttle through said exit opening in said front wall of said hopper onto said screening machine conveyor.

2. The combination according to claim 1 with the addition of a divider extending between the front and rear walls of said hopper below the lower end of said ramp and disposed between said guide and said end walls, said divider directing bottles rolling from said ramp to each side thereof to form said columns of bottles resting on said shuttle.

3. The combination according to claim 2 wherein said shuttle contains a channel in its lower portion and with the addition of a fixed divider blade within said channel uncovered on reciprocation of said shuttle.

4. The combination according to claim 3 wherein said bin conveyor is an endless conveyor having compartments each accommodating a single bottle, said bin conveyor extending from within said bin above said ramp of said hopper so that bottles roll from said compartments onto said ramp, bottles on said ramp preventing bottles from rolling from said compartments so that such bottles are recirculated by said conveyor.

References Cited

UNITED STATES PATENTS

| | | | |
|---|---|---|---|
| 1,527,337 | 2/1925 | Wilcox | 198—47 |
| 2,182,955 | 12/1939 | Allen | 221—175 |
| 2,618,421 | 11/1952 | Basus | 221—93 |
| 3,338,370 | 8/1967 | Maulini | 198—24 |

RICHARD E. AEGERTER, Primary Examiner